United States Patent
Hinds

[11] Patent Number: 6,006,513
[45] Date of Patent: Dec. 28, 1999

[54] MANUFACTURED STRIP FOR FORMING INTERLOCKING LINK

[76] Inventor: Jerry Neal Hinds, 3001 S. Carrier #505, Grand Prairie, Tex. 75052

[21] Appl. No.: 09/036,856

[22] Filed: Mar. 9, 1998

Related U.S. Application Data

[60] Provisional application No. 60/041,301, Mar. 18, 1997.
[51] Int. Cl.[6] .................................................. F16G 15/12
[52] U.S. Cl. ..................................... 59/80; 59/82; 59/900
[58] Field of Search .................................. 59/80, 78, 82, 59/93, 900

[56] References Cited

U.S. PATENT DOCUMENTS

| | | | |
|---|---|---|---|
| 216,533 | 6/1879 | Rumpp | 59/90 |
| 1,177,079 | 3/1916 | Agrillo | 59/90 |
| 1,847,182 | 3/1932 | Heyer | 59/91 |
| 2,840,983 | 7/1958 | Keilbach | 59/91 |
| 4,056,928 | 11/1977 | de Vries | 59/83 |
| 4,122,666 | 10/1978 | Jessop | 59/80 |
| 4,448,017 | 5/1984 | Stark | 59/80 |
| 5,341,634 | 8/1994 | Straight | 59/80 |
| 5,412,935 | 5/1995 | Rozenwasser | 59/80 |
| 5,636,506 | 6/1997 | Yngvesson | 59/80 |

FOREIGN PATENT DOCUMENTS

| | | | |
|---|---|---|---|
| 632416 | 8/1962 | Italy | 59/91 |
| 195899 | 7/1957 | Netherlands | 59/900 |

*Primary Examiner*—David Jones

[57] ABSTRACT

A flexible strip of material having four predetermined leg segments comprised of left inner leg segment (10), left outer leg segment (14), right outer leg segment (18), and right inner leg segment (22). Said leg segments are distinguishable by three creases comprised of left leg crease (12), center crease (16), and right leg crease (20).

8 Claims, 1 Drawing Sheet

MANUFACTURED STRIP FOR FORMING INTERLOCKING LINK

This application claims benefit of Provisional Appl. 60/041,301 filed Mar. 18, 1997.

BACKGROUND

1. Field

This invention relates to interlocking links which can be interlaced for the purpose of creating various user defined creations.

2. Description

People of all age groups have commonly crafted bracelets, belts, picture frames, etc. by weaving various materials. Children of the past have folded gum wrappers into links which could be interlocked to form a chain for the purpose of making bracelets.

These paper links were made by folding the paper twice parallel to the length to make a strip, then carefully and accurately folded perpendicular in quarters to create evenly spaced open leg segments. Dollar bills have also been used to construct these links, but even more folds were utilized to make them.

These paper links suffer from a number of disadvantages:

(a) The use of paper as a medium alone is not susceptible to repeated use and the links tear easily, because of low tensile strength.

(b) The bulkiness of these multi-layer links are cumbersome to interlace.

(c) The hand construction of these links require careful and tedious folding, to ensure the accuracy of equal and proportionate leg length.

(d) The use of paper as a medium is not water repellent.

This invention offers several advantages and improvements for consumer utilization:

(a) provides high tensile strength and endurance.

(b) provides uniform link dimension, while eliminating parallel folds.

(c) provides pre-formatted leg segments for ease of folding and interlacing.

(d) provides resistance to moisture.

SUMMARY OF THE INVENTION

Accordingly, the reader will see that the interlocking link can be used to make various useful items. It's simplicity in one direction folding formation, durable material, precise perimeter cut, and perpendicular creases are all advantages in the utilization of these links for limitless woven creations. Several specific advantages of this link are:

Singular strip design facilitates the formation of the link with three easy folds. And they're reversible. Leg segments can be folded inward from either side.

Durable material allows reuse of links. Will not tear under normal use. Water resistant.

Precise perimeter cutting of links provides accuracy and uniformity in interlacing of links.

Perpendicular creases insure precise segment dimension and allow folding of each segment to be quick and effortless.

Although the descriptions above contain many specificities, these should not be construed as limiting the scope of the invention but as merely providing illustrations of some of the presently preferred embodiments of this invention. For example, the links can be made of many different materials which have favorable characteristics; the outer leg segments can be cut at various triangular degrees instead of square or rectangular; the perpendicular creases can be scored from either side or a combination of sides, etc.

Thus the scope of the invention should be determined by the appended claims and their legal equivalents, rather than by the examples given.

BRIEF DESCRIPTION OF THE DRAWINGS

In the drawings, all figures have the same number. All drawings are not-to-scale.

Figure 1:
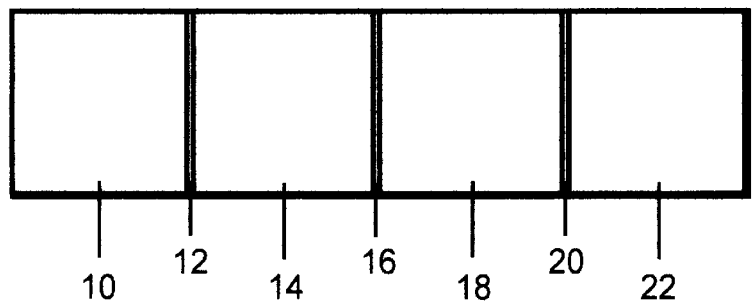
FIG. 1 shows a top view of strip link with perpendicular creases and distinct leg segments.

REFERENCE NUMERALS IN DRAWINGS 10 left inner leg segment
12 left leg crease
14 left outer leg segment
16 center crease
18 right outer leg segment
20 right leg crease
22 right inner leg segment
24 optional one or two sided laminate
26 optional graphic imprint

DETAILED DESCRIPTION OF THE PREFERRED EMBODIMENTS AND DRAWING—FIGS. 1 TO 5

Figure 2:
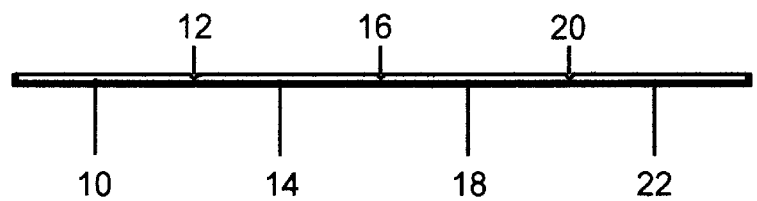
FIG. 2 shows a side view of strip link with perpendicular creases.

A typical embodiment of the link of the present invention is illustrated in FIG. 1 (top view) and FIG. 2 (side view). The link is a one piece strip of uniform cross section consisting of a flexible sheet with three creases perpendicular to the length to facilitate folding left leg segment, right leg segment, and center fold. In the preferred embodiment, the link is a flexible synthetic sheet, called Teslin® (a registered trademark of PPG Industries). However, the link can consist of any material which can be folded without tearing, such as polyethylene-tere-phthalate (PET—hyphens here supplied to facilitate pronunciation), polypropylene, vinyl, polyethylene, nylon, rubber, leather, various impregnated or laminated materials, various plasticized materials, cardboard, paper, etc. In the preferred embodiment, the thickness of the material utilized for these links is 0.10 millimeters. However, material may be thicker or thinner depending on several factors, including flexibility, pliability, and dimension stability.

The link is comprised of a left inner leg segment 10, a left leg crease 12, a left outer leg segment 14, a center crease 16, a right outer leg segment 18, a right leg crease 20, and a right inner leg segment 22. In the preferred embodiment, the links are perimeter die-cut and perpendicular creased from a pre-manufactured combination cut and score blade die on a platen letterpress. However, the links can be cut with various other machine knives and/or trimmers, and the creases may be manufactured by various rotary or fixed scoring machines. The preferred embodiment for link dimension is 79.375 mm in length, 9.525 mm in width, and 0.10 mm thick, with both left and right creases a distance of 21.430 mm from center crease.

Figure 3:
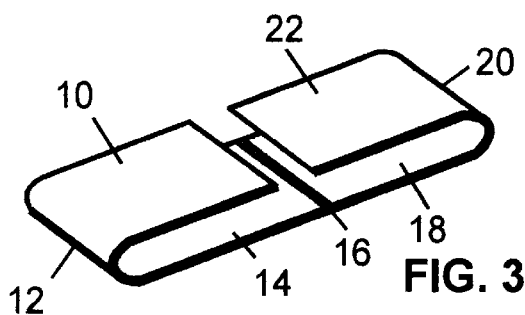
FIG. 3 shows both inner leg segments folded on perpendicular creases.

FIG. 3 illustrates the formation of left leg loop segment consisting of inner left leg segment 10, outer left leg segment 14, and the formation of right leg loop segment consisting of outer right leg segment 18, and right inner leg segment 22. These left and right leg loop segment formations are created by folding link on left leg crease 12, and right leg crease 20. In the preferred embodiment, both inner leg segments 10 and 22, have a length ratio of 1.00:1.09 to outer leg segments 14 and 18, respectively. However, inner leg segments to outer leg segment length ratios may vary from 1.00:1.00 to 1.00:3.00 respectively.

Figure 4:
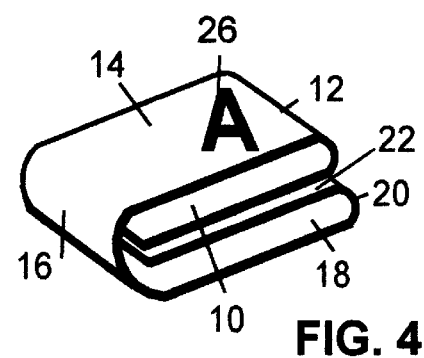
FIG. 4 shows completely folded link with optional graphic imprint.

FIG. 4 illustrates the complete folded formation of link consisting of folding inner left leg segment 10 on left leg crease 12 inwardly and parallel with outer left leg segment 14; folding inner right leg segment 22 on right leg crease 20 inwardly and parallel with outer right leg segment 18; and folding left inner and outer leg segments 10 and 14, respectively, and folding right inner and right outer leg segments 22 and 18, respectively, inwardly on center crease 16 until left inner leg segment 10 and inner right leg segment 22 are facing each other in a parallel plane. In the preferred embodiment, both left outer leg segment 14 and right outer leg segment 18 have a length to width ratio of 2.167:1.00, respectively. However, outer leg segments 14 and 18 may vary equally in length to width ratios from 2.083:1.00 to infinite:1.00. This link may also be extruded from plastic without necessity of creases. FIG. 4 also illustrates optional graphic imprint.

Figure 5:
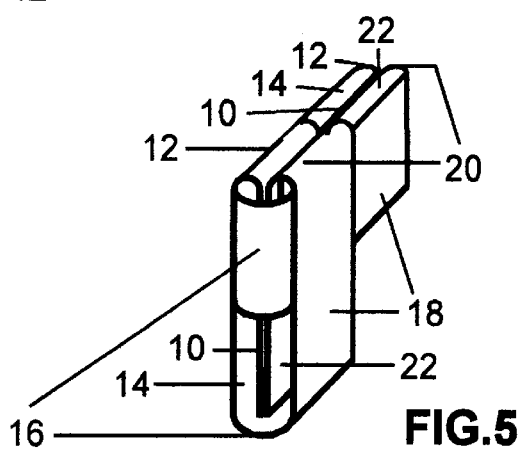
FIG. 5 shows two folded links interlaced.

FIG. 5 illustrates the interlacing of two completely folded links. The left leg loop segment of first link, formed by folding left inner leg segment 10 on left leg crease 12 inwardly, parallel, and facing left outer leg segment 14, is inserted between left outer leg segment 14 and left inner leg segment 10 on second link. Likewise, the right leg loop segment of first link, formed by folding right inner leg segment 22 on right leg crease 20 inwardly, parallel, and facing right outer leg segment 18, is inserted between right outer leg segment 18 and right inner leg segment 22 of second link.

Figure 6:
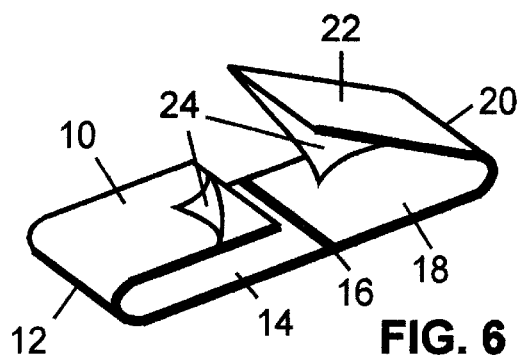
FIG. 6 shows option of one or two sided laminate.

FIG. 6 illustrates an option of one or two sided lamination 24.

I claim:

1. An outlined U like shape interlocking link conventionally formed out of gum wrappers or similar square sheet of paper by folding said sheet in half twice in the same direction whereby a multiple ply rectangular shape is achieved, the length of said rectangular shape then folded in four approximately equal parts by folding both ends of said rectangular shape inward towards the center thereof, said rectangular shape folded again at the center to form the said outlined U like shape interlocking link, wherein the improvement comprises forming said link from a machine manufactured perimeter cut rectangular strip of flexible material of substantial single thickness characterized by distinct and dimensionally accurate segments distinguished by machine crease means embedded in the surface of said strips perpendicular to the length and across the width thereof into four approximately equal parts, comprised of two outer and two inner parts, by three machine crease means, comprised of two outer and one center crease means, said strip being formed into an interlocking link by folding each said outer segment on respective said outer crease means inward towards the center crease means, the said strip then folded on said center crease means thereby forming a dimensionally precise said outlined U like shape interlocking link, the said link may be interlocked with successive said link by inserting said segments on each side of said center crease means at a right angle and through the opening of identical said segments of successive said link.

2. The strip of claim 1 wherein said flexible material is composed of a synthetic printing sheet.

3. The strip of claim 1 further including custom designed graphic imprinting specifically positioned on said rectangular strip.

4. The strip of claim 1 further including a laminated material over said rectangular strip.

5. The strip of claim 1 wherein more or less machine crease means are utilized on said rectangular strip.

6. A U shaped interlocking link conventionally comprised of a square sheet of paper folded to form a multiple ply rectangular shape and then folding said rectangular shape to form said link, wherein the improvement comprises forming said interlocking link from a manufactured single ply rectangular strip of flexible material comprised of a left inner leg segment and a left outer leg segment which are distinguished by placement of a left leg machine crease means; a right outer leg segment and a right inner leg segment which are distinguished by placement of right leg machine crease means; and a center machine crease means distinguishing between the two said left leg segments and the two said right leg segments, the said outer leg segments both having a minimum length to width ratio of 2.083:1.00 and both said inner leg segments each having a minimum length ratio to said outer leg segments of 1.00:3.00, the said rectangular strip being formed into said link by folding said left inner leg segment on said left leg machine crease means inward towards said center machine crease means, folding said right inner leg segment on said right leg machine crease means inwards towards center machine crease means, and completing the formation of said link by folding on said center crease means whereby length width surfaces of said inner leg segments are facing in a parallel plane with each other forming a dimensionally accurate and consistently conforming said U shaped interlocking link, whereby said link can be interlocked with successive said link by inserting said left leg segments and said right leg segments at a right angle and through said left leg segments and said right leg segments respectively of said successive link.

7. The strip of claim 6 wherein said rectangular strip of flexible material is composed of a synthetic printing sheet with graphic imprinting on both surface sides specifically oriented on said rectangular strip.

8. The strip of claim 6 further including lamination of one or both surface sides of said rectangular strip.

* * * * *